(12) United States Patent
Iter

(10) Patent No.: US 8,132,363 B2
(45) Date of Patent: Mar. 13, 2012

(54) STRUCTURES AND METHODS FOR ATTACHING A DISPLAY ARTICLE TO A GERMINATEABLE SEED AND A GERMINATED PLANT CARRYING THE STRUCTURE AND/OR THE DISPLAY ARTICLE

(76) Inventor: Eyal Iter, Tel-Aviv (IL)

( * ) Notice: Subject to any disclaimer, the term of this patent is extended or adjusted under 35 U.S.C. 154(b) by 71 days.

(21) Appl. No.: 12/703,850

(22) Filed: Feb. 11, 2010

(65) Prior Publication Data

US 2011/0035999 A1    Feb. 17, 2011

Related U.S. Application Data

(60) Provisional application No. 61/233,161, filed on Aug. 12, 2009.

(51) Int. Cl.
*A01G 1/00* (2006.01)
(52) U.S. Cl. .................. 47/58.1 SE; 47/58.1 R; 47/57.6
(58) Field of Classification Search .................. 47/20.1, 47/29.1, 29.2, 14, 41.01, 41.15, 56, 57.6, 47/58.1 R, 58.1 SE, 84, DIG. 9
See application file for complete search history.

(56) References Cited

U.S. PATENT DOCUMENTS

| | | | |
|---|---|---|---|
| 1,783,430 A | 12/1930 | Johnson | |
| 2,096,507 A | 10/1937 | Czeszcziczki, Jr. | |
| 2,902,795 A | 9/1959 | Heigl et al. | |
| 2,984,940 A | 5/1961 | Vincent | |
| 3,380,190 A | 4/1968 | Granger | |
| 3,680,256 A | 8/1972 | Kusumi | |
| 3,908,308 A | 9/1975 | Meyers | |
| 3,975,859 A | 8/1976 | Müller | |
| 4,118,889 A | 10/1978 | Lamlee | |
| 4,353,183 A | 10/1982 | Estkowski | |
| 4,554,761 A | 11/1985 | Tell | |
| 4,774,787 A * | 10/1988 | Schwartz | 47/65.5 |
| 5,564,224 A * | 10/1996 | Carlson et al. | 47/57.6 |
| 5,720,129 A | 2/1998 | Lantinberg | |

FOREIGN PATENT DOCUMENTS

WO    WO 2009/156855    12/2009
WO    WO 2011/018782    2/2011

OTHER PUBLICATIONS

International Search Report and the Written Opinion Dated Feb. 18, 2011 From the International Searching Authority Re: Application No. PCT/IL2010/000606.
Communication Relating to the Results of the Partial International Search Dated Dec. 15, 2010 From the International Searching Authority Re. Application No. PCT/IL2010/000606.

* cited by examiner

*Primary Examiner* — Rob Swiatek
*Assistant Examiner* — Ebony Evans

(57) ABSTRACT

Articles-of-manufacturing which comprise (a) a germinateable seed having a germinating end and an apparent germination polarity; or alternatively a germinateable seed having a hole formed therein; and (b) a cage or, respectively alternatively, a member securing the germinateable seed; the cage having a structure such that when securing the germinateable seed, the cage not inhibiting or slowing a germination process of the germinateable seed; the member is secured to the hole. Seedlings which comprise the cage or member engaged therewith. Articles-of-manufacturing which comprise the seed or seedling, the cage or member and a display article attached to the cage or member. Methods of making same and of displaying the display article in context of the seedling.

25 Claims, 11 Drawing Sheets

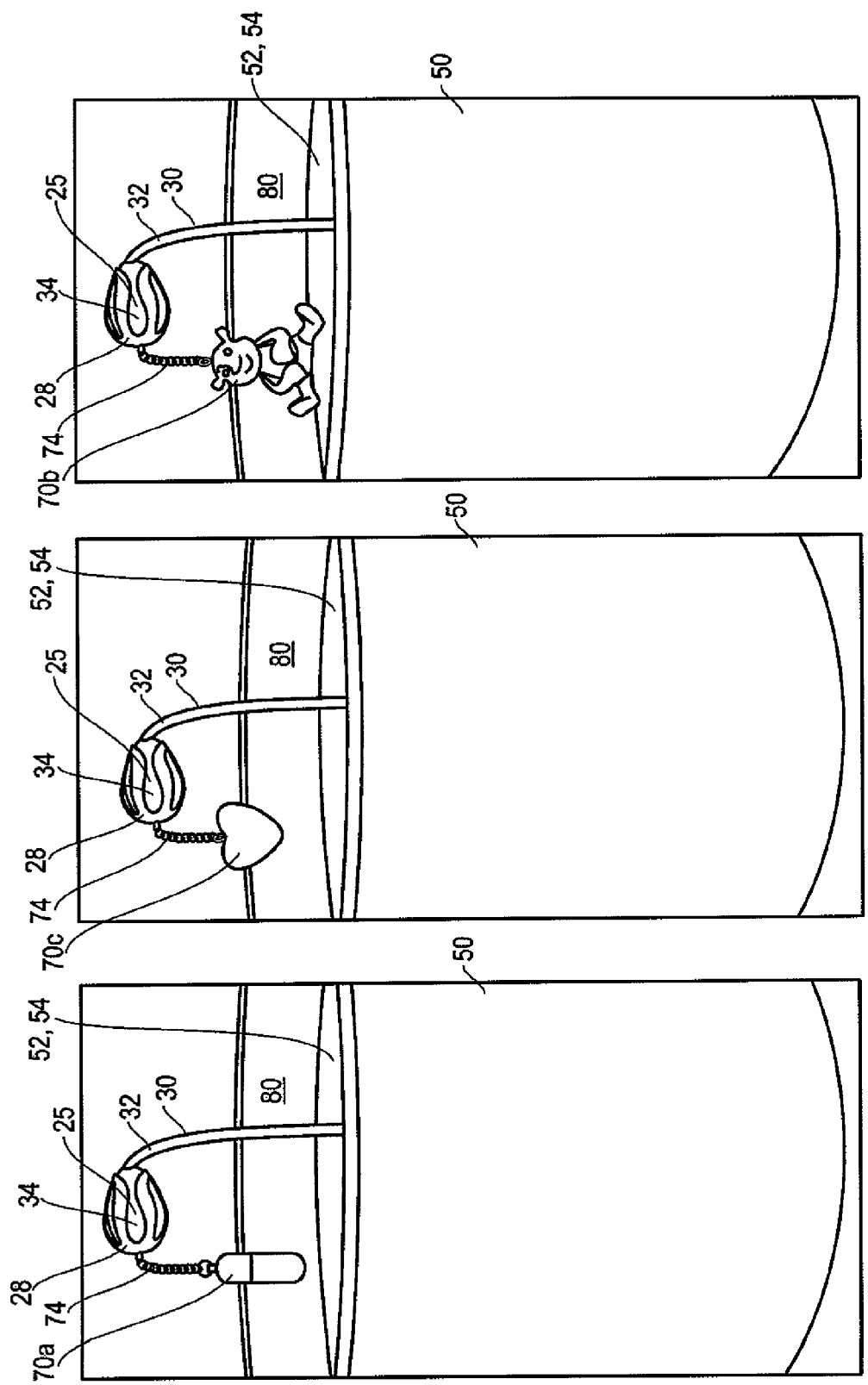

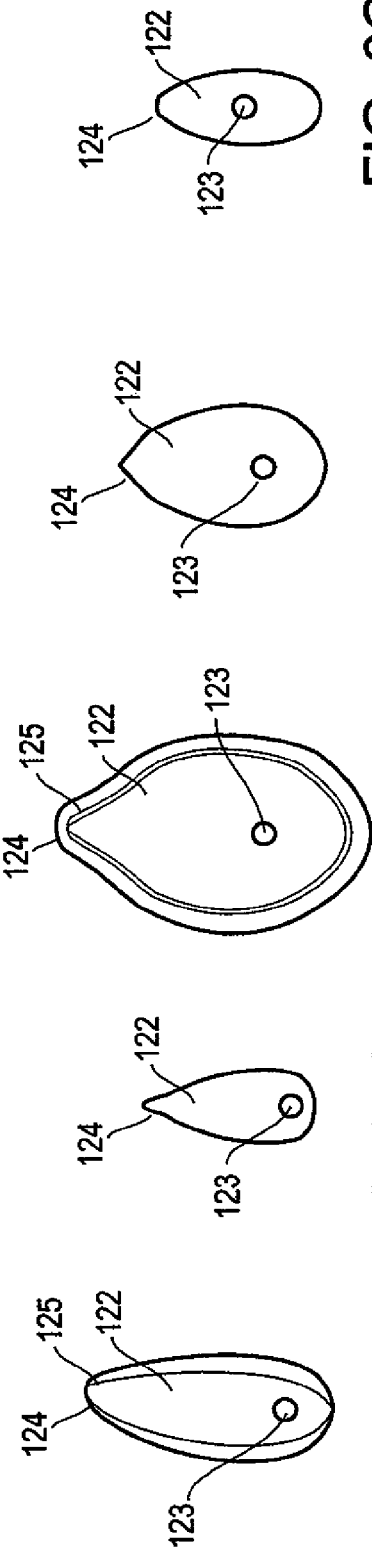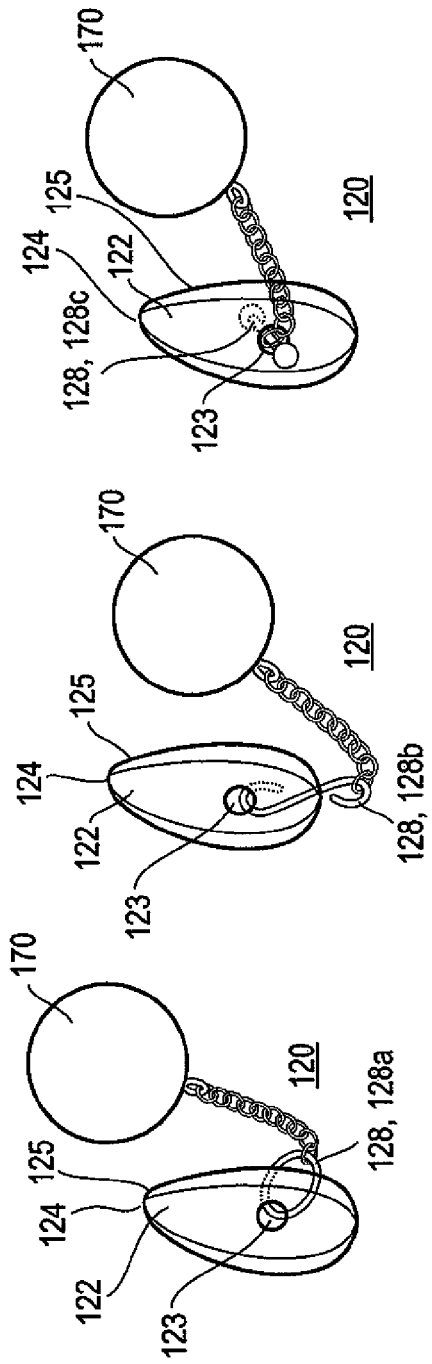

US 8,132,363 B2

STRUCTURES AND METHODS FOR ATTACHING A DISPLAY ARTICLE TO A GERMINATEABLE SEED AND A GERMINATED PLANT CARRYING THE STRUCTURE AND/OR THE DISPLAY ARTICLE

RELATED APPLICATION(S)

This application claims the benefit of priority from U.S. Provisional Patent Application No. 61/233,161, filed on Aug. 12, 2009, the contents of which are incorporated herein by reference.

FIELD AND BACKGROUND OF THE INVENTION

The present invention, in some embodiments thereof, relates to a structures and methods for attaching a display article to a germinateable seed and a germinated seedling carrying the structure and/or the display article.

U.S. Pat. No. 4,774,787 to Schwartz describes an apparatus and method for attaching novelty articles, such as small precious stones, to a cotton plant for display. A cotton seed is secured in a cage to which is attached the novelty article, and the seed, cage, and novelty article are buried in a planting medium, such that when the plant grows from the seed, the novelty article is secured thereto.

Additional background art include U.S. Pat. Nos. 1,783,430; 2,096,507; 2,902,795; 2,984,940; 3,908,308; 3,975,859; 4,118,889; and 4,353,183.

The contents of all of the above documents are incorporated by reference as if fully set forth herein.

SUMMARY OF THE INVENTION

According to an aspect of some embodiments of the present invention there is provided an article-of-manufacturing comprising (a) a germinateable seed having a germinating end and an apparent germination polarity; and (b) a cage securing the germinateable seed; the cage having a structure such that when securing the germinateable seed, the cage not inhibiting or slowing a germination process of the germinateable seed.

According to an aspect of some embodiments of the present invention there is provided an article-of-manufacturing comprising (a) a seedling of a dicotyledonous plant having a hypocotyl and a pair of cotyledons attached to the hypocotyl; and (b) a cage, the pair of cotyledons being secured in the cage.

According to some embodiments of the invention, a display article is attached to the cage. Upon germination in a planting medium, the cage and the display article emerge above the planting medium. According to some embodiments of the invention, the cage forms a contextual, esthetic and/or a functional part of the display article.

According to an aspect of some embodiments of the present invention there is provided a method for displaying a display article, the method comprising: (i) providing in a vessel containing a planting medium an article-of-manufacturing in the planting medium, the article-of-manufacturing comprises: (a) a germinateable seed having a germinating end and an apparent germination polarity; (b) a cage securing the germinateable seed; the cage having a structure such that when securing the germinateable seed, the cage not inhibiting or slowing a germination process of the germinateable seed; and (c) the display article attached to the cage; and (ii) watering the germinateable seed so as to induce germination of the germinateable seed to an extent the display article being emerged above the planting medium.

According to some embodiments of the invention, the germinateable seed is a dicotyledonous seed, the structure of the cage is such that when securing the germinateable seed, the cage allows a formation of a seedling having a hypocotyl and a pair of cotyledons, the pair of cotyledons are secured in the cage.

According to an aspect of some embodiments of the present invention there is provided an article-of-manufacturing comprising (a) a germinateable seed having a hole formed therethrough, a position and size of the hole being selected so as to maintain a germination ability of the germinateable seed; and (b) a member attached to the germinateable seed through the hole.

According to an aspect of some embodiments of the present invention there is provided an article-of-manufacturing comprising (a) a seedling of a dicotyledonous plant having a hypocotyl and a pair of cotyledons attached to the hypocotyl; and (b) a member passing through holes in the cotyledons.

According to some embodiments of the invention, the seed does not have apparent germination polarity and is, for example, selected from the group consisting of cotton, chickpea and bean.

According to some embodiments of the invention, a display article is attached to the member. Upon germination in a planting medium, the member and the display article emerge above the planting medium. According to some embodiments of the invention, the member forms a contextual, esthetic and/or a functional part of the display article.

According to an aspect of some embodiments of the present invention there is provided a method for displaying a display article, the method comprising (i) providing in a vessel containing a planting medium an article-of-manufacturing in the planting medium, the article-of-manufacturing comprises (a) a germinateable seed having a hole formed therethrough, a position and size of the hole being selected so as to maintain a germination ability of the germinateable seed; (b) a member attached to the germinateable seed through the hole; and (c) the display article attached to the member; and (ii) watering the germinateable seed so as to induce germination of the germinateable seed to an extent the display article being emerged above the planting medium.

According to some embodiments of the invention, the germinateable seed is a dicotyledonous seed.

According to some embodiments of the invention, the structure of the cage is such that when securing the germinateable seed, the cage allows a formation of a seedling having a hypocotyl and a pair of cotyledons, the pair of cotyledons are secured in the cage.

According to some embodiments of the invention, the dicotyledonous seed is a sunflower seed.

According to some embodiments of the invention, the dicotyledonous seed having the apparent germination polarity is selected from the group consisting of melon, watermelon, cucumber, pea, beans and pumpkin.

According to some embodiments of the invention, the structure of the cage is such that the germinating end of the seed is exposed when the cage is securing the germinateable seed.

According to some embodiments of the invention, the cage has foldable concentric leave shaped elements.

According to some embodiments of the invention, the number of leaves is 2, 3, 4, 5, 6, 7 or 8.

According to some embodiments of the invention, the article-of-manufacturing further comprises a vessel containing planting medium the seed and cage or member being placed in the planting medium.

According to some embodiments of the invention, the planting medium comprises vermiculite.

According to some embodiments of the invention, the planting medium comprises perlite.

According to some embodiments of the invention, the planting medium comprises perlite and vermiculite.

According to some embodiments of the invention, the perlite constitutes at least 20% of the planting medium.

According to some embodiments of the invention, the perlite constitutes at least 30% of the planting medium.

According to some embodiments of the invention, the vermiculite constitutes at least 20% of the planting medium.

According to some embodiments of the invention, the vermiculite constitutes at least 30% of the planting medium.

According to some embodiments of the invention, the planting medium comprises at least one planting substance selected from the group consisting of natural or artificial soil, montmorillonite, perlite, vermiculite, sand, peat, sphagnum, silica peat and lime and/or any combination thereof.

According to some embodiments of the invention, the planting medium comprises humidity which is insufficient to initiate germination of the germinateable seed, e.g., less than 5% humidity; less than 3% humidity; less than 1% humidity.

According to some embodiments of the invention, the planting medium comprises humidity which is insufficient to sustain growth of mold, fungi and/or bacteria, so as to keep a germinateable seed in a germinateable condition until germination is induced.

According to some embodiments of the invention, the planting medium is pre-dried.

According to some embodiments of the invention, the planting medium is a hygroscopic, temperature and shock insulating.

According to some embodiments of the invention, the vessel is openably sealed.

According to some embodiments of the invention, vessel is adapted for hydroponic watering.

According to some embodiments of the invention, the vessel is adapted for bottom watering.

According to some embodiments of the invention, the vessel is adapted for top watering.

According to some embodiments of the invention, the vessel has a removable top cover.

According to some embodiments of the invention, the top cover may be used for bottom watering.

According to some embodiments of the invention, a tray element is provided for holding the vessel and for bottom watering of the vessel.

According to some embodiments of the invention, the display article comprises a jewelry, a gemstone, a figurative element, a flag, a printed substrate an engraved substrate, a tube, e.g., a tube containing a note or scroll.

According to some embodiments of the invention the seed has a germinating end and an apparent germination polarity.

According to some embodiments of the invention the hole is so positioned, shaped and sized so as to accelerate a rate of a germination process of the germinateable seed upon watering.

According to some embodiments of the invention the germinateable seed is a dicotyledonous seed forming a seedling upon germination, the seedling having a hypocotyl and a pair of cotyledons, the member passes through holes in the cotyledons.

According to some embodiments of the invention, the germinateable seed is a dicotyledonous seed, the structure of the cage is such that when securing the germinateable seed, the cage allows a formation of a seedling having a hypocotyl and a pair of cotyledons, the pair of cotyledons are secured in the cage.

According to some embodiments of the invention, the member is selected from the group consisting of a ring, a rod, a wire, a thread, a string, a screw and a hook.

According to some embodiments of the invention, the germinateable seed comprises a seed coat.

According to some embodiments of the invention, the germinateable seed is uncoated (i.e., had its seed coat removed).

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below and above. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIGS. 5A-C are demonstration of different display articles according to some aspects of the present invention;

FIGS. 6A1-C are side views of sunflower, watermelon and cucumber seeds with holes formed therein used in some embodiments of the present invention;

FIGS. 7A-C are views of sunflower, watermelon and cucumber seeds with holes, the holes are engaged by different members according to some embodiments of the present invention;

DESCRIPTION OF SPECIFIC EMBODIMENTS
OF THE INVENTION

The present invention, in some embodiments thereof, relates to articles-of-manufacturing and methods useful in attaching a display article to a germinateable seed and/or germinated seedling and methods of displaying the display article using the articles-of-manufacturing.

Figure 10C:
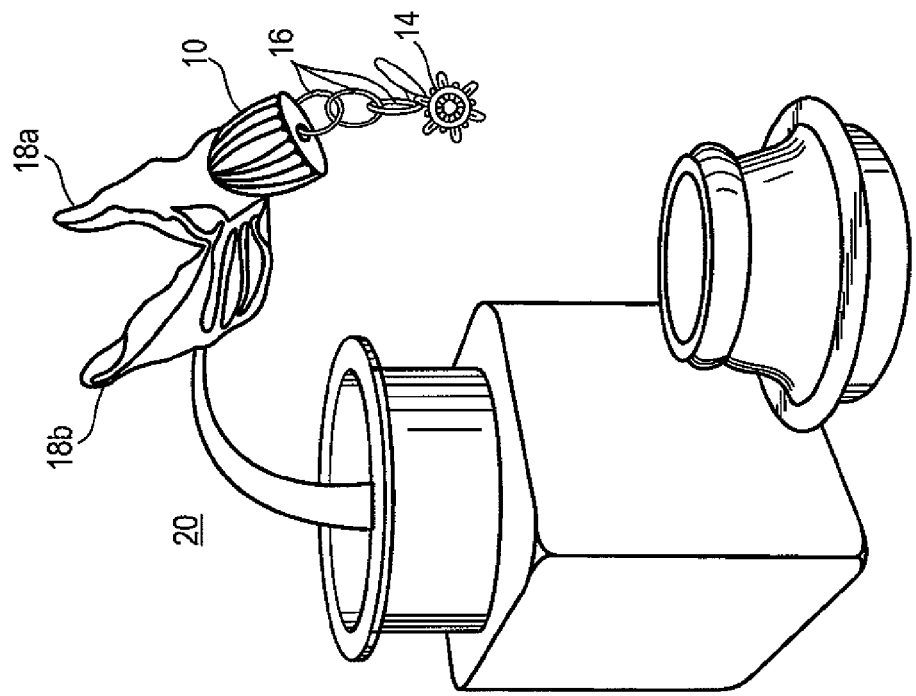
FIGS. 10A-C are replicas of prior art FIGS. 1a, 1b and 2 of U.S. Pat. No. 4,774,787, respectively.
Figure 10A:
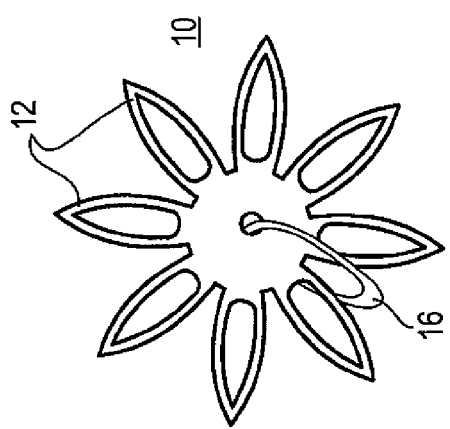
Figure 10B:
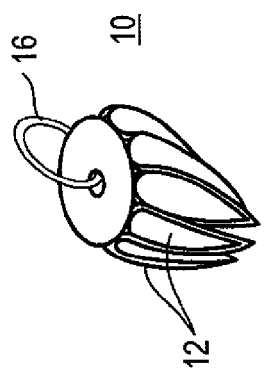

For purposes of better understanding some embodiments of the present invention, as illustrated in FIGS. 1A-9B of the drawings, reference is first made to the construction and operation of a prior art device as illustrated in FIGS. 10A-10C.

FIGS. 10A and 10B, which are reiterated from U.S. Pat. No. 4,774,787, show a prior art cage 10 which can be used to secure a seed therein, by folding leaves 12 (as shown in FIG. 10B) to form an enclosure for holding the seed. Prior art cage 10 is said in U.S. Pat. No. 4,774,787 to secure a dicotyledonous seed. The only example given in U.S. Pat. No. 4,774,787 for a dicotyledonous seed is of a cotton seed. The cotton seed is assumed to be within cage 10, e.g., in its configuration shown in FIG. 10B. Prior art cage 10 is shown in FIG. 10C to display a display (or novelty) article 14 which is attached to prior art cage 10 via rings 16. Prior art cage 10 is shown in FIG. 10C to be engaged with one, 18a. (but not two, 18a and 18b) cotyledon (i.e., 18a) of a germinated seedling 20 of the dicotyledonous cotton seed. It is totally unclear how by securing a dicotyledonous seed as described in FIG. 10B, cage 10 becomes engaged with only one (18a) of cotyledons (embryonic leaves) 18a and 18b and not securing both cotyledons 18a and 18b therein. Based on FIG. 10C, it may be postulated that the invention described in U.S. Pat. No. 4,774,787 was not practiced prior to the filing date of U.S. Pat. No. 4,774,787.

When the inventor of the present invention attempted to practice the invention described in U.S. Pat. No. 4,774,787, the inventor of the present invention realized that when using the securing configuration of the cage with a cotton seed as described in U.S. Pat. No. 4,774,787 and possibly shown in FIG. 10B, not only the way the cage secures the cotyledons of the seedling differs from what is described in U.S. Pat. No. 4,774,787 (as illustrated in FIG. 10C), a major fraction of the seeds fail to germinate altogether. Extensive trial and error has led the inventor of the present invention to realize that the reason for the low and unsatisfactory germination rates obtained when securing a cotton seed in a cage as is described in FIG. 10B is due to the fact that a cotton seed fails to have an apparent polarity. In other words, one cannot visibly determine without splitting a cotton seed into two halves, where is the seed embryo positioned therein. As such, in the cases wherein the closed end of the cage is positioned against the germinating portion of a cotton seed, germination is hampered and a seedling fails to sprout. It is important to note in this regard that the importance of nearly complete (97%, or more) germination which is required in order to turn the invention described in U.S. Pat. No. 4,774,787 into an attractive commercial product, is discussed in detail in U.S. Pat. No. 4,774,787. However, this goal evidently cannot be achieved using the technology described in U.S. Pat. No. 4,774,787.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Referring again to the drawings, it is to be emphasized that like parts are labeled with the same numerals.

FIGS. 1A-5C illustrate various aspects and embodiments of the present invention.

As used herein in the claims section below, the term "apparent" means visible to and/or detectable by a naked human eye.

As used herein in the claims section below, the phrase "a seed having a germinating end and an apparent germination polarity" means a seed in which the germination end is apparent either when the seed is coated with its seed coat and/or when the seed coat is removed, so as to allow one to determine by naked eye a position on the seed and/or the side of the seed from which a hypocotyl will emerge upon germination.

As used herein in the claims section below, the terms "coat" and "seed coat" are interchangeably used to identify the outer coating part (peel) of a seed.

As used herein in the claims section below, the term "uncoated" is used to identify a seed without a seed coat, e.g., a seed that had its seed coat removed.

Figure 2A:
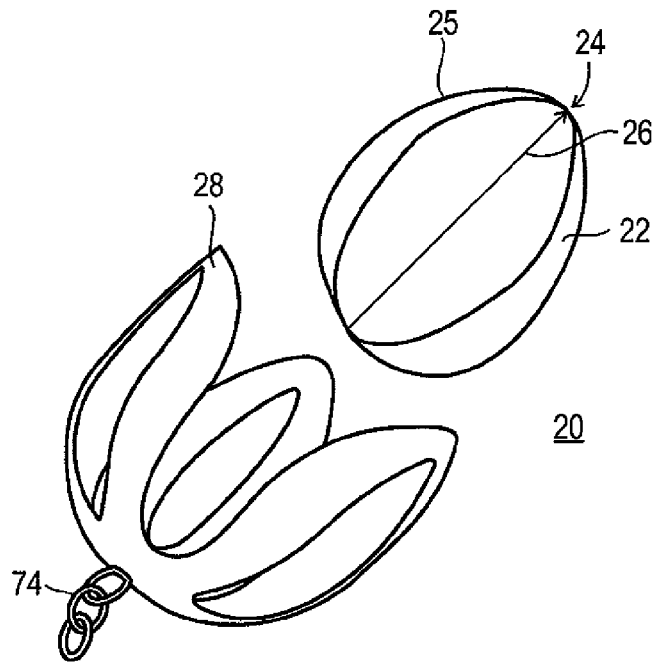
FIGS. 2A-C are snapshots of 3 stages in a process of caging a germinateable seed according to the present invention.
Figure 2B:
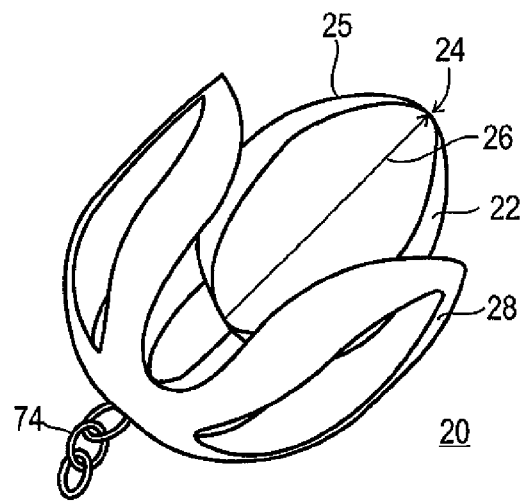
Figure 2C:
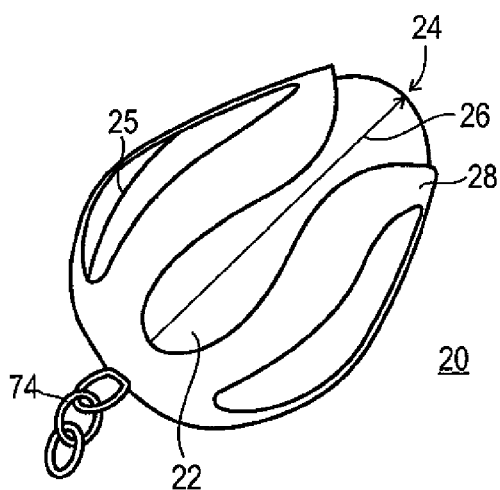

As shown in FIGS. 2A-C, according to an aspect of the present invention there is provided an article-of-manufacturing 20 which comprises a germinateable seed 22 having a germinating end 24 and an apparent germination polarity, as is indicated in FIG. 2A-C by arrow 26, and a cage 28 securing germinateable seed 22. Seed 22 may retain its seed coat 25 or may be uncoated. Cage 28 has a structure selected such that when securing germinateable seed 22, cage 28 does not inhibit or slow a germination process of germinateable seed 22, e.g., when inducted to germinate by providing suitable germination conditions, e.g., watering.

According to some embodiments of the present invention germinateable seed 22 is a dicotyledonous seed, whereby, and as is further illustrated in FIGS. 4A-5C, the structure of cage 28 is such that when securing germinateable seed 22, cage 28 allows a formation of a seedling 30 having a hypocotyl 32 and a pair of cotyledons 34, the pair of cotyledons 34 are secured within cage 28. In the case where seed 22 retains its seed coat 25, cage 28 secures cotyledons 34 while cotyledons 34 remain (at least partially) within seed coat 25.

Another aspect of the present invention provides for a method for displaying a display article. The method according to this aspect of the invention comprises the following method steps: (i) providing in a vessel containing a planting medium an article-of-manufacturing in the planting medium, the article-of-manufacturing comprises: (a) a germinateable seed having a germinating end and an apparent germination polarity; (b) a cage securing the germinateable seed; the cage having a structure such that when securing the germinateable seed, the cage not inhibiting or slowing a germination process of the germinateable seed; and (c) the display article attached to the cage; and (ii) watering the germinateable seed so as to induce germination of the germinateable seed to an extent the display article being emerged above the planting medium.

As exemplified in FIGS. 4A-5C, and consequently to the above description of one of the method of the present invention, another aspect of the present invention provides an article-of-manufacturing 80, which comprises a seedling 30 of a dicotyledonous plant having a hypocotyl 32, a pair of cotyledons 34 (optionally uncoated or alternatively coated with seed coat 25) roots 35 positioned on opposite ends of hypocotyl 32; and a cage 28, the pair of cotyledons 34 (and seed coat 25, of seed 22, when retained) are secured within cage 28.

Many seeds have a germinating end and an apparent germination polarity (either when coated by a seed coat or when uncoated), including, but not limited to, seeds of sunflower, melon, watermelon, cucumber, pea and pumpkin. All seeds having a germinating end and an apparent germination polarity (either in their coated or their uncoated form) are suitable for use in context of this and other aspects and embodiments of the present invention. In some aspects and embodiments of the present invention, as is further described below with particular reference to embodiments of the invention described in context of FIGS. 6A1-9B, seeds lacking an apparent germination polarity, such as cotton, chickpea and bean seeds, can also be used in either their coated or uncoated form.

Several criteria may be employed when selecting seeds for use in context of the present invention, including, but not limited to, germination time post induction of germination conditions (e.g., watering), seedling growth rate, endurance to heat and other a-biotic conditions, endurance to biotic conditions, such as pathogens, physical strength of seed and/or seedling, and/or the esthetics of the seedling.

In order to augment the rate of germination once germination is induced (e.g., by watering), the seed may be chemically (e.g., by acid, base or enzyme treatment) or physically pretreated, so as to fully or partially remove, puncture or weaken its seed coat, so as to allow faster and homogenous hydration of the seed, hydration being the major trigger for germination.

According to some embodiments of the present invention, and as shown particularly in FIGS. 2A-5C, the structure of cage 28 is selected such that germinating end 24 of seed 22 is exposed when cage 28 is securing germinateable seed 22.

Figure 1A:
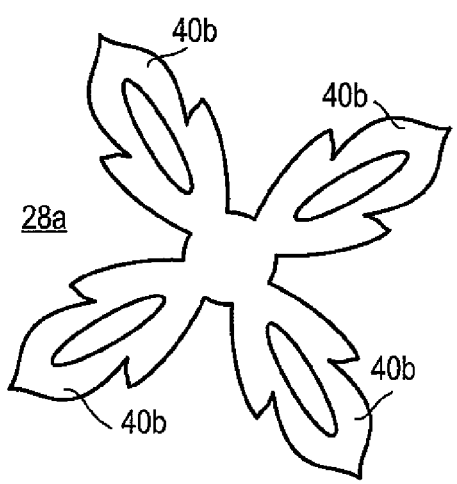
FIGS. 1A-E are top views of un/pre-folded cage structures used in some embodiments of the present invention.
Figure 1B:
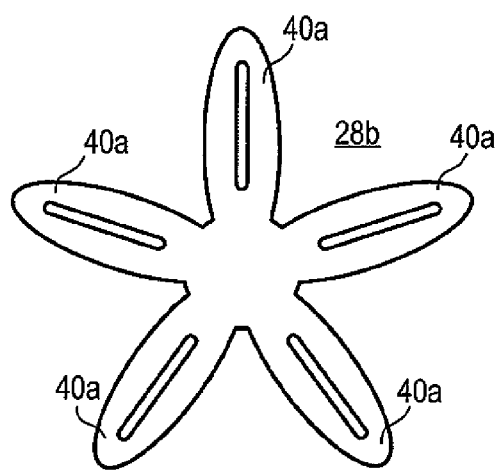
Figure 1C:
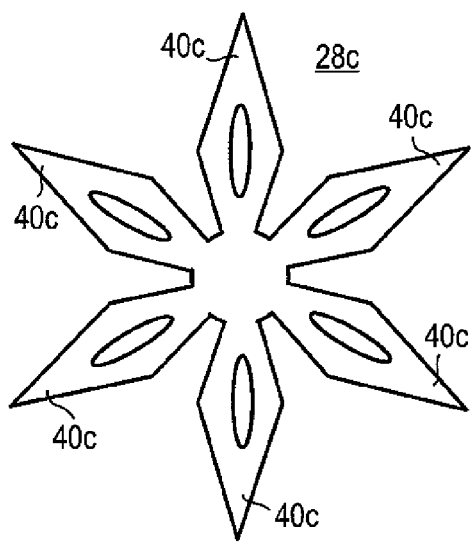
Figure 1D:
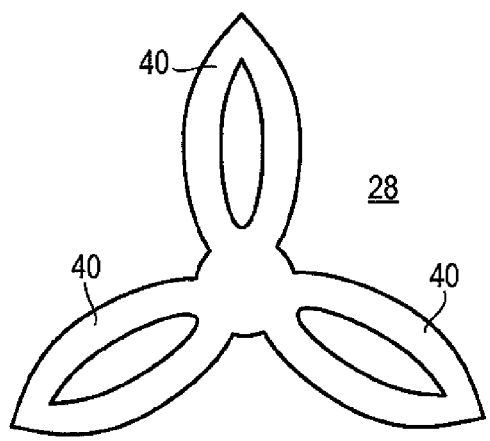
Figure 1E:
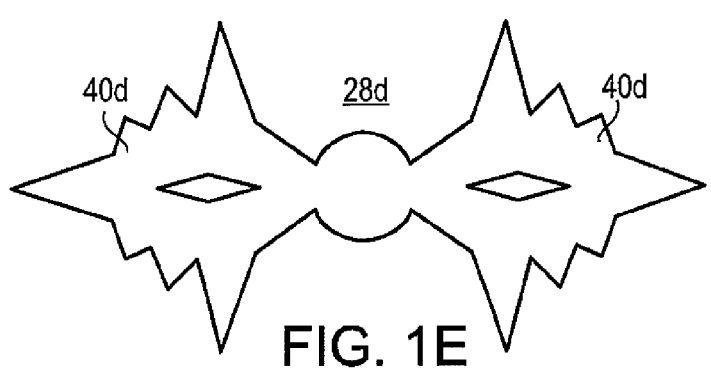

According to some embodiments of the invention, as is shown in FIGS. 1A-5C, and most particularly in FIGS. 1A-1E (in a non-folded configuration), cage 28 (referred to in FIGS. 1A-C and 1E as cage 28a, 28b, 28c and 28d) has in some embodiments 2, 3, 4, 5 or 6 foldable concentric leave shaped elements 40 of various potential geometries, e.g., 40 (FIGS. 1D, 2A-5C), 40a (FIG. 1B), 40b (FIG. 1A), 40c (FIG. 1C) or 40d (FIG. 1E). It is clear that other geometries are applicable, as well and that the exemplified geometries are not intended to be limiting.

Other configurations of the cage are also envisaged, including, but not limited to, knitted or weaved cage made of metal, synthetic (e.g., Nylon) or natural fibers.

According to embodiments of the invention, the number of leaves, e.g., leaves 28, and their geometry, e.g., geometry 40, are selected so as to achieve one or more of the following goals (a) esthetics; (b) minimal surfaces annexed to the seed, so as to allow efficient and homogenous hydration; (c) minimal or no impact on germination; (d) efficient securing to the seed and germinated seedling throughout the germination process; and/or (f) further functioning with respect to holding an object at a later stage, i.e., post germination, as is further delineated below. The weight and overall structure and geometry of cage 28 are selected such that it will remain attached to seedling 30 throughout its germination and sprouting.

According to embodiments of the present invention, the cage is made of metal, plastic, silicone or any other suitable material. In some embodiments, the cage is made of a noble metal such as gold, silver or platinum. Stainless steel, aluminum and nickel may alternatively be used. Still alternatively, copper can be used. Alloys, such as, but not limited to, brass can also alternatively be used.

According to some embodiments of the present invention, article-of-manufacturing 20 and/or 80, further comprises a vessel 50. Vessel 50, which is particularly shown in FIGS. 3A-5C contains planting medium 52, whereby, seed 22 and cage 28 are placed within planting medium 52.

Vessel 50 may be of any shape size and material of make. It can be light transparent or not. It can be made of any moldable and/or curable material, including, but not limited to, clay, paper, wood, metal, glass or plastic.

In some embodiments of the invention, seed 22 is seeded not more than about 0.5 cm to about 5 cm below the air facing surface 54 of planting medium 52. The optimal depth of seeding seed 22 depends on the type of seed employed. For sunflower seeds, the optimal depth is about 1 cm to about 1.5 cm. The depth of seeding seed 22 is typically selected so as to achieve high germination percent (percent of seeds that germinate into seedlings out of the total number of seeded seeds) and/or fast germination rate (time to sprout, rate of sprouting following exposure to germination inducing conditions, e.g., watering). As particularly shown in FIGS. 3A-B, in some embodiments of the invention, the seeding orientation of seed 22 is selected such that germinating end 24 is facing surface 54 of planting medium 52.

According to some embodiments of the present invention, planting medium 52 comprises vermiculite (e.g., 20-80%, in some embodiments about 67-68%), perlite (e.g., 20-80%, in some embodiments about 32-33%) and/or both.

Other planting media include, but are not limited to soils of various kinds, both artificial and natural soils, montmorillonite, perlite, vermiculite, sand, peat, sphagnum, silica, peat and lime and/or any combination thereof.

In some embodiments of the invention, planting medium 52 comprises humidity which is insufficient to initiate germination of germinateable seed 22 and/or in is insufficient to sustain growth of mold, fungi and/or bacteria, so as to keep germinateable seed 22 in a germinateable condition until germination is induced, e.g., by watering. To this end, planting medium 52 can be pre-dried. In some embodiments of the invention, planting medium 52 is selected to be hygroscopic, so as to ensure fast and homogeneous hydration of seed 22 upon watering and further to facilitate top, bottom and/or hydroponic watering. In some embodiments of the invention, planting medium 52 is selected temperature and shock insulating, so as to protect seed 22 from a-biotic stress conditions.

Several additional criteria may be applied when selecting plating medium 52, including, but not limited to, specific gravity and esthetics (e.g., color, texture).

Plating medium 52 may pretreated with disinfectants, herbicides and/or insecticides and/or and may be supplemented with fertilizers, insecticides, plant hormones, germination enhancers and/or antibacterial/antifungal agents.

Figure 3A:
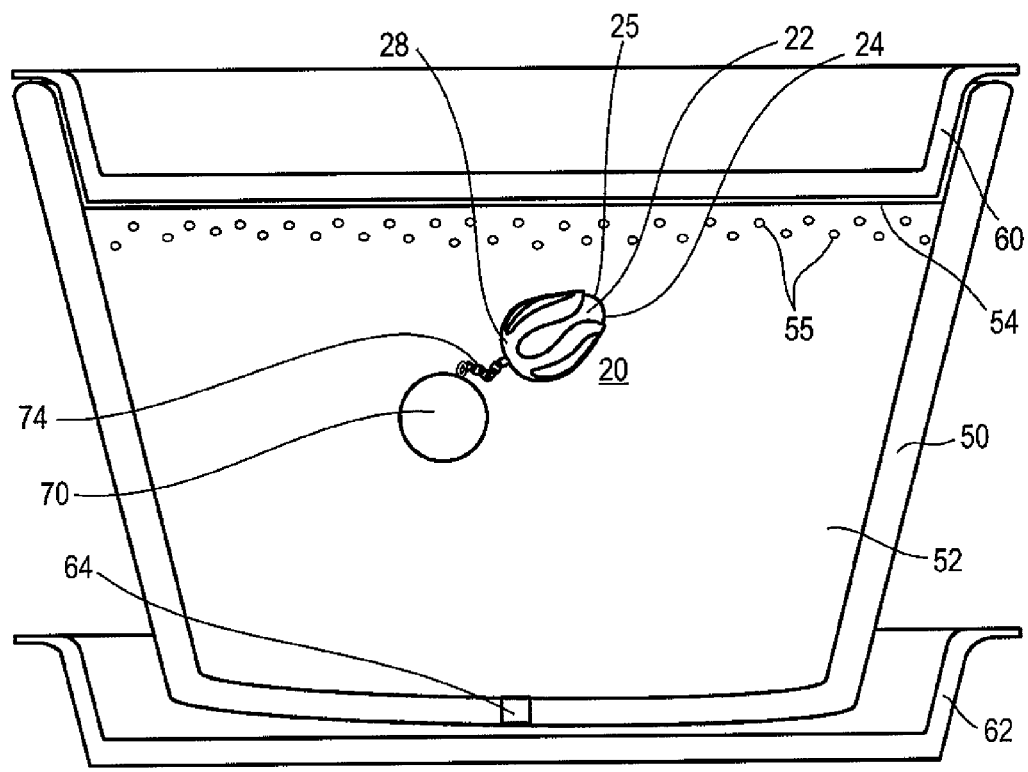
FIGS. 3A-B are cross sectional views showing a vessel, an article-of-manufacturing, a removable top cover and a watering/holding tray according to some embodiments of the present invention.
Figure 3B:
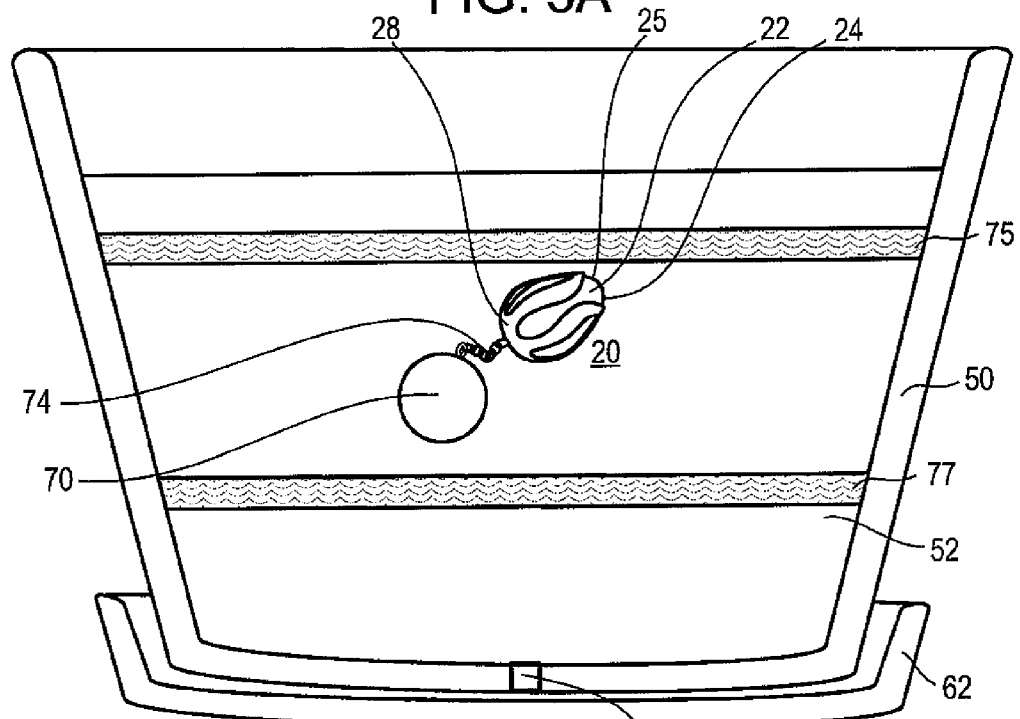

As is shown in FIG. 3B, planting medium 52 may include supporting layers 75 and 77 which are designed and selected so as to assist in retaining seed 22 and its cage 28 in a fixed position in planting medium 52, especially when planting medium 52 is of low specific gravity and/or is compressible. Supporting layer 75 is selected so as not to inhibit or slow seedling 30 from sprouting there through, whereas supporting layer 77 is selected so as to allow root 35 to penetrate therethrough. Each of both of supporting layers 75 and/or 77 are selected so as not to inhibit or slow the hydration of seed 22 upon watering. Supporting layers 75 and 77 may be of any suitable material and have any suitable structure to provide for their function. For example, supporting layers 75 and 77 can be layers of cotton wool or cotton beads. Alternatively, supporting layers 75 and 77 may be in the form of a net made of, e.g., plastic.

Figure 4A:
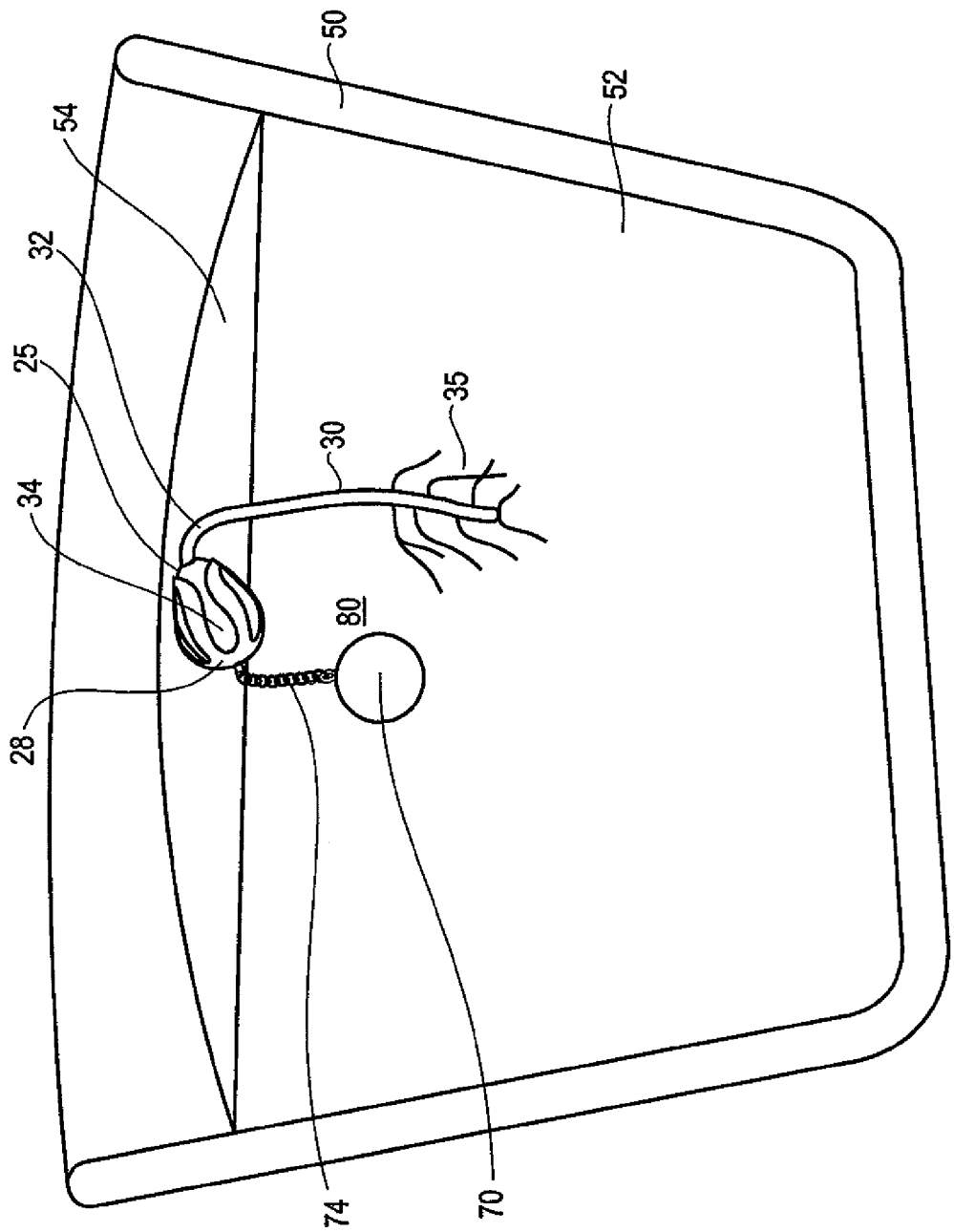
FIGS. 4A-C are snapshots of 3 stages of germination and display according to some embodiments of the present invention.
Figure 4B:
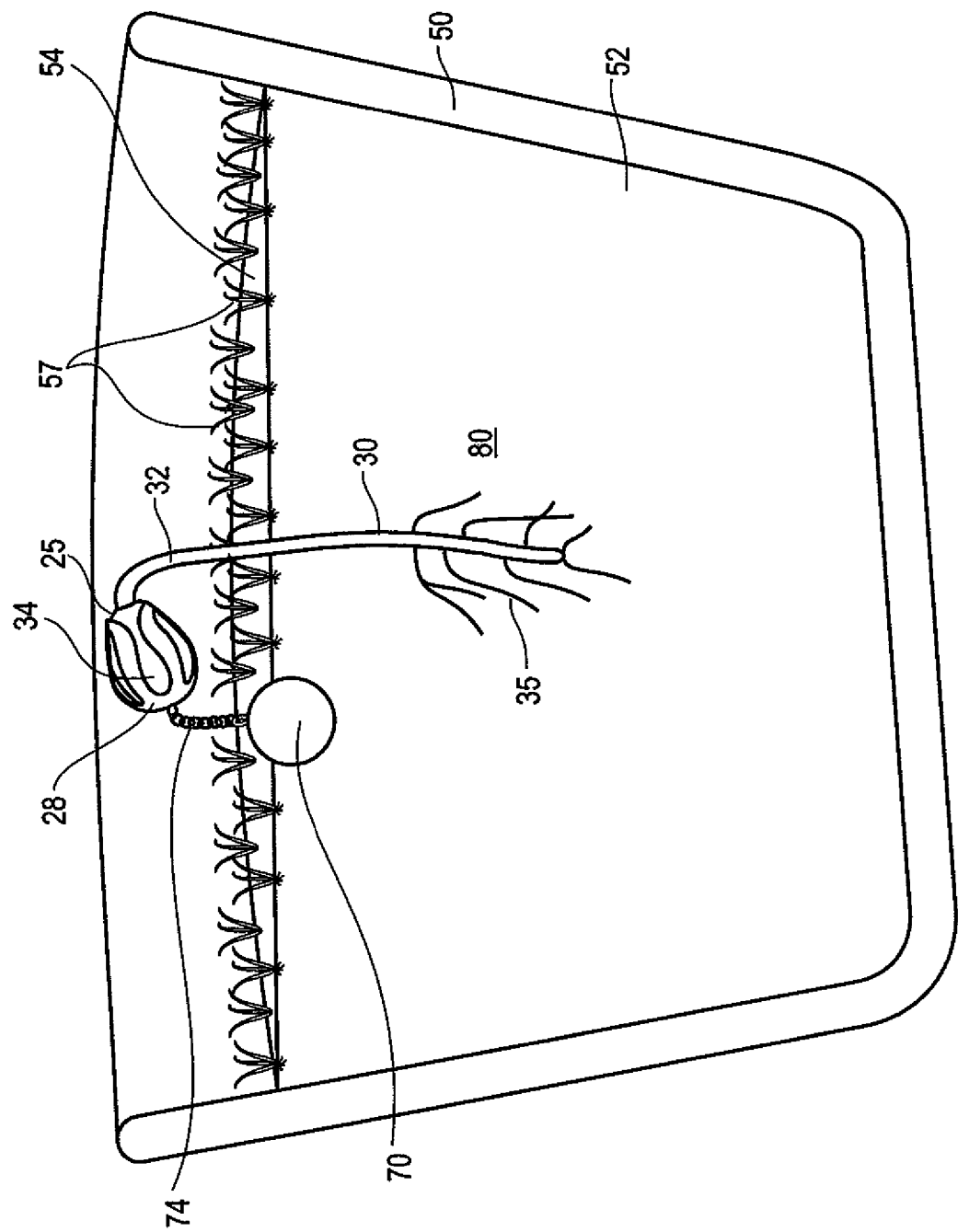
Figure 4C:
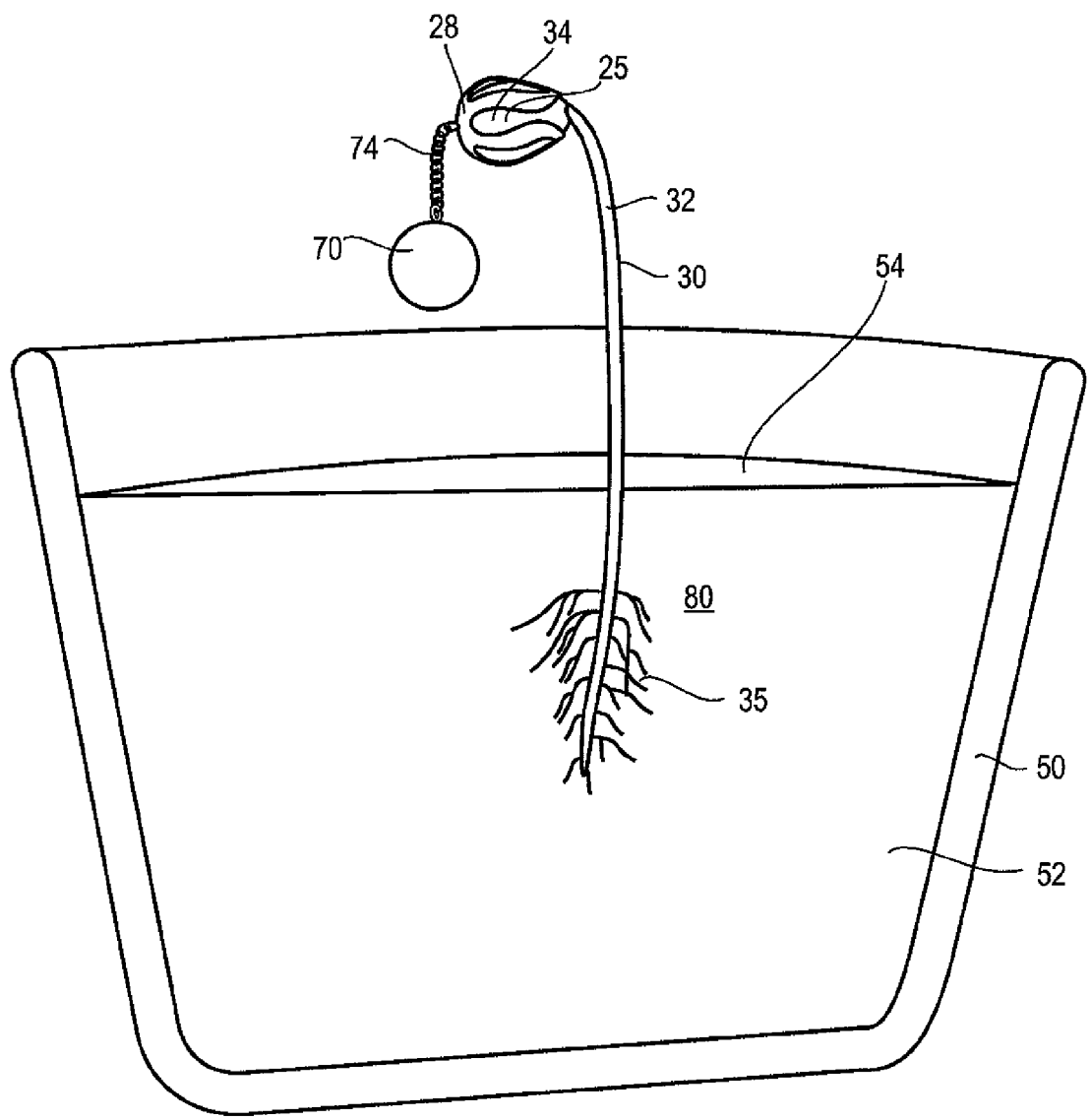
Figure 8A:
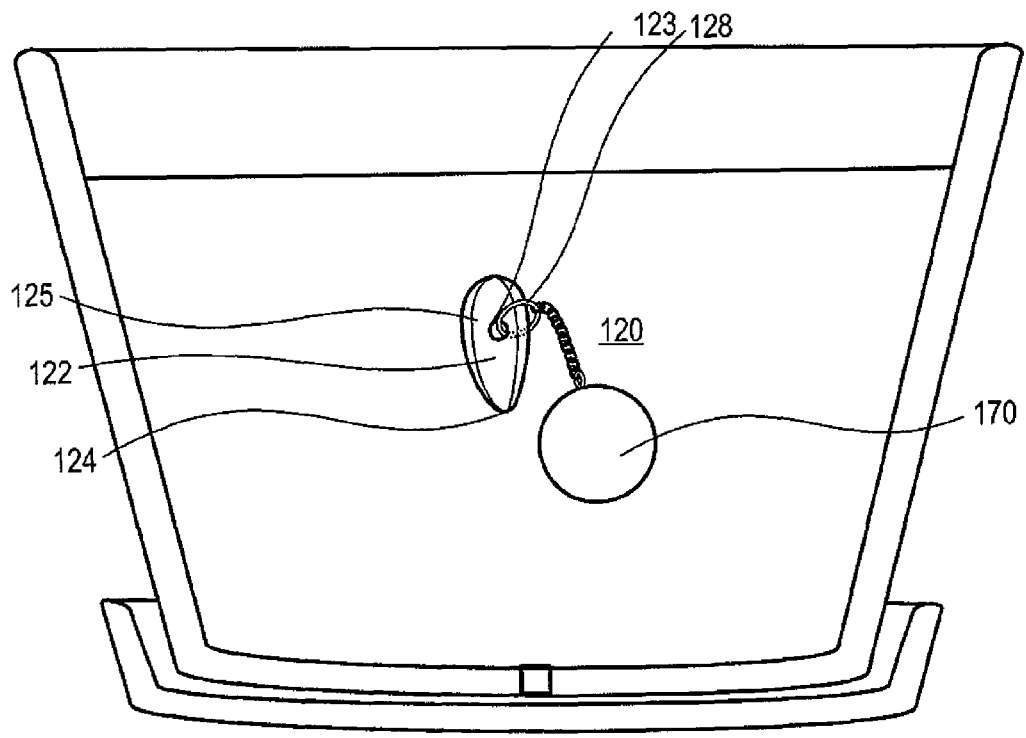
FIGS. 8A-B are snapshots of 2 stages of germination and display according to some embodiments of the present invention.
Figure 8B:
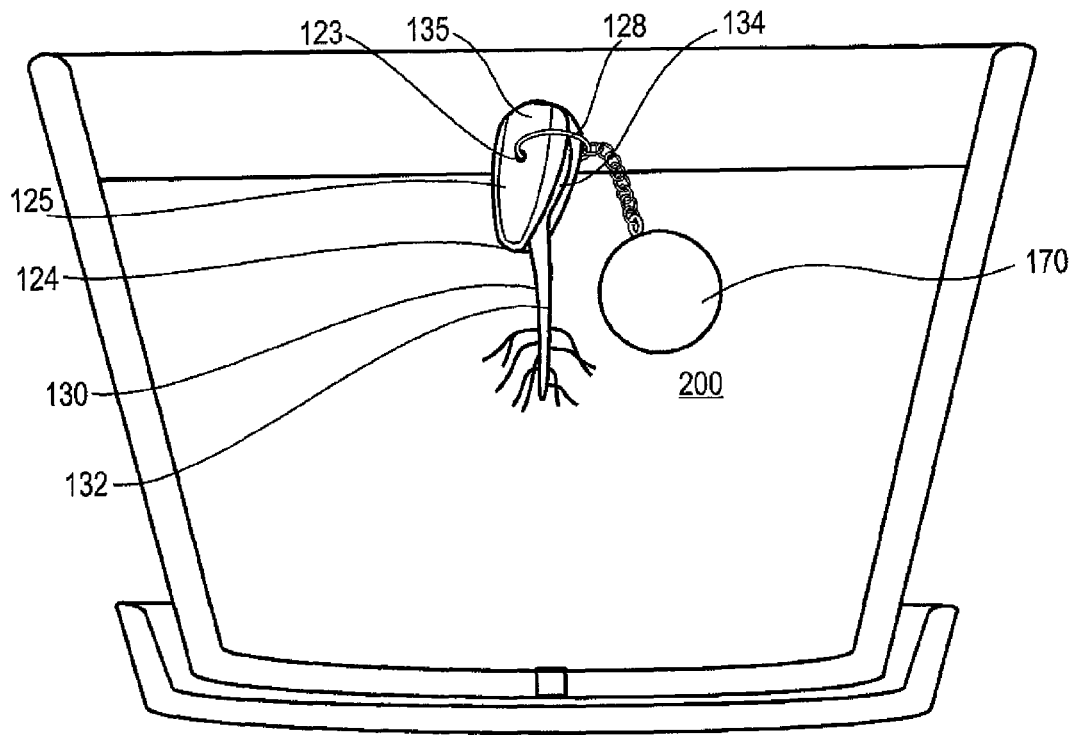
Figure 9A:
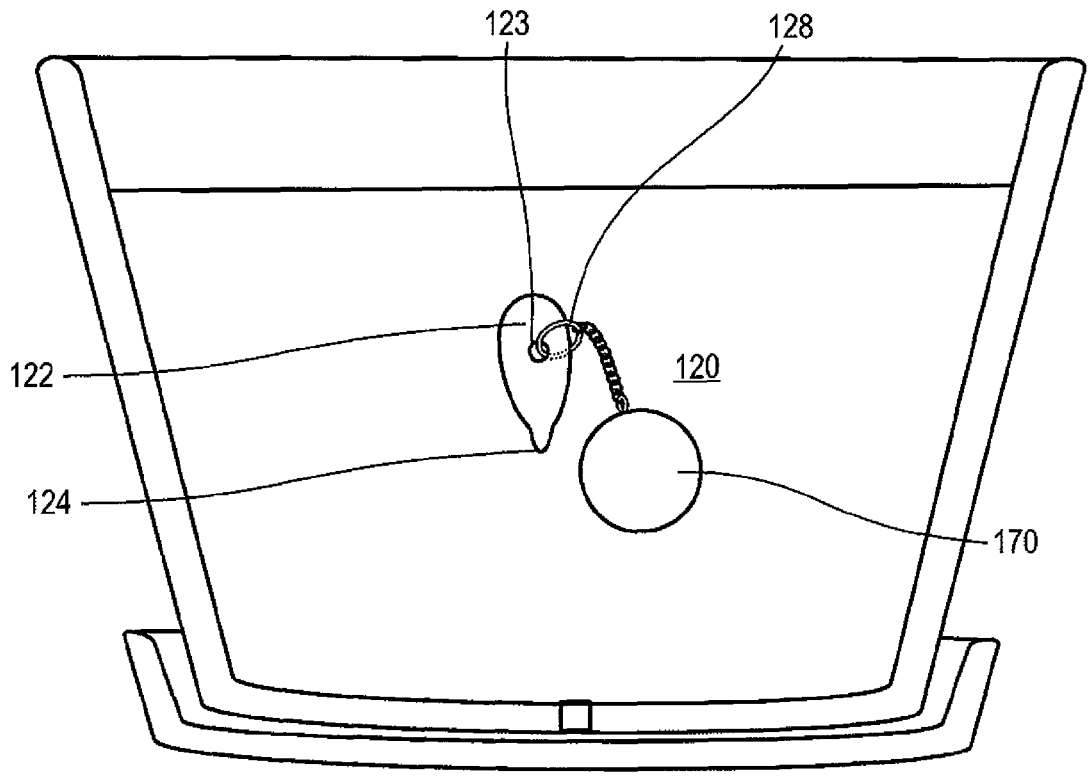
FIGS. 9A-B are snapshots of 2 stages of germination and display according to some embodiments of the present invention.
Figure 9B:
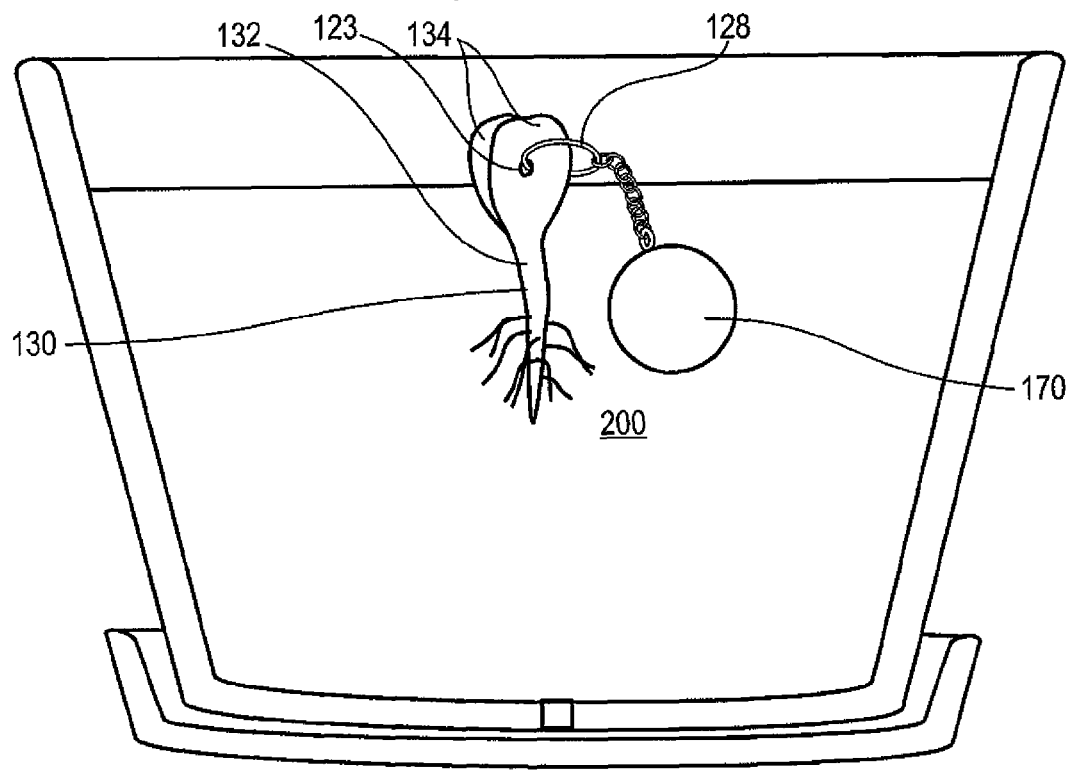

As shown in FIG. 3A, decorative seeds 55 giving rise, as shown in FIG. 4B, to decorative seedlings 57, may be added to planting medium 52, which seedlings 57 will co-germinate and co-sprout along with seedling 30. Decorative seeds 55 may be of any desirable kind, dicotyledonous and/or monocotyledonous including, but not limited to, all the seeds mentioned herein and in addition, for example, seeds of, rice, grass, corn, barley, wheat and the like. In an embodiment of the invention, seeds 55 germinate and sprout faster than seed 22. In some embodiments of the present invention, seeds 55 are of an odor spreading plant, such as, but not limited to, mint or the like. In some embodiments of the present invention, seeds 55 give rise to edible seedlings or plants.

As exemplified in FIG. 3A, vessel 50 may be openably sealed by a removable top cover 60 or by any other sealing techniques. Top cover 60 may be used in context of any of the aspects and embodiments of the invention to accelerate the rate of germination once germination conditions (i.e., watering) are met, by inhibiting loss of humidity from planting medium 52 through surface 54 thereof. Top cover 60 may be used to compress planting medium 52 in vessel 50 to prevent dislocation of seed 22 upon storage and/or shipping. Top cover 60 may be selected so as to allow vacuum to be applied and maintained within vessel 50.

According to some embodiments of the invention, vessel 50 can be made adapted for hydroponic watering. According to some embodiments of the invention, vessel 50 may be adapted for bottom watering, e.g., as shown in FIGS. 3A-3B, via opening 64 and a watering/holding tray element 62. In some embodiments of the invention, as is specifically show in FIG. 3A, cover 60 may be used after its removal as watering tray 62. Opening 64 may be secured via a wick or a removable plug. Depending on the type of the planting medium employed and the size of opening 64, it is possible in some embodiments that opening 64 will not be secured.

As exemplified in FIGS. 3A-5C, according to some embodiments of the present invention, article-of-manufacturing 20 and/or 80 further comprise(s) a display article 70, shown in general as having a ball/circular shape in FIGS. 3A-4C and which may acquire an endless number of shapes and/or functions. In FIGS. 5A-C, display article 70 is exemplified as a tube or capsule shaped article 70a, a teddy bear shaped article 70b and a heart shaped article 70c, directly or indirectly (e.g., via rings or chain 74) attached to cage 28.

Display article 70 can be practically anything which is tangible and having ornamental and/or contextual value. Display article 70 may be a piece of jewelry, such as, but not limited to, a ring, a pendent, an earring and/or a pair of a earrings, with or without a gemstone.

Suitable gemstones are in particular precious stones, like diamond, sapphire, emerald, tourmaline, hematite, jade and the like and also gemstones made of other minerals and other non-precious materials. The gemstones can also be made, however, of non-mineral materials such as amber, glass, ceramic or plastic. In addition, they do not have to be necessarily square, but can have different shapes and exhibit sharp and/or rounded edges and/or corners and also have facets. By "beads" are understood here not only oriental pearls, cultured pearls, shell beads and other beads made of mother-of-pearl or conventional jewelry beads, but all possible bead-shaped materials, like precious stone beads such as jade beads, hematite beads, coral beads, amber beads, ivory beads, metal beads, glass beads, ceramic beads, plastic beads, and the like. The beads do not have to be absolutely spherical, but can also have other rounded shapes, like tear-shaped, oval or the like.

Display article 70 may be a key holder, a key (that opens, e.g., a box, the box may have another display article therein and may form a marketed kit along with the article of manufacturing of the present invention), a gemstone holder (with or without a gemstone) a figurative element, such as a statue, a charm, a monument, a tube or capsule which may comprise a printed substrate or any other substance. Display article 70 may comprise a plate or three-dimensional element formed with a textual or a figurative engravement. Display article 70 may alternatively be a flag or other national or international symbol. Display article 70 may be a charm, such as, but not limited to, an eye, a fish, a horse shoe and a hand (hamsa). Display article 70 may also be a key chain, a note formed on or in plastic material, an light flashing item, a memory card or medium storing therein or thereon any king of data, such as, but not limited to, music, video, photography and/or text and the like, the data having commercial or personal context and is readable by a suitable reader (e.g., a computer), an item which glows in the dark, promotion giveaway, an article carrying a code, e.g., an alphanumeric code or barcode, such as a code that can be used in on-line in context of the Internet (World Wide Web, WWW), e.g., in a context of a raffle, lottery or a contest.

In some embodiments of the invention, cage 28 forms a part of display article 70, e.g., cage 28 can be the hanging part of an earring. Once detached from the cotyledons 34 and/or seed coat 25, cage 28 may be used to secure any desired object, such as, but not limited to, a gemstone.

As exemplified in FIGS. 6A1-9B, according to an aspect of the present invention, there is provided an article-of-manufacturing 120 which comprises a germinateable seed 122 having a hole 123 formed therethrough. The position, shape and size of hole 123 is selected so as to maintain a germination ability of germinateable seed 122. Article-of-manufacturing 120 further comprises a member 128 attached to germinateable seed 122 through hole 123. A is shown in FIGS. 6A1, 6B1, 7A-7C and 8A-B seed 122 may retain its seed coat 125 or may be uncoated (as shown in FIGS. 6A2, 6B2, 6C, and 9A-B. When retaining its seed coat, hole 123 formed in seed 122 is made also through seed coat 125.

Hence, according to some aspects of the invention, seed 122 is uncoated prior to or after the formation of hole 123 therein and before the engagement of member 128 thereto.

According to some other aspects of the invention, seed 122 is coated with seed coat 125 when hole 123 is formed and member 128 is engaged through the hole while passing both through seed coat 125 and the interior parts of seed 122, as is further described below.

Seed 122 has a germinating end 124 and may have a germination side and an apparent germination polarity, e.g., as in seed 22 described above, or may not have an apparent germination polarity, e.g., like a cotton seed. So, any of the seeds listed above may be used also in context of this aspect of the present invention. Additionally, seeds that have no apparent germination polarity, such as, but not limited to, cotton, chickpea and bean may also be used in context of this aspect of the present invention. Any seed may be used with or without its seed coat.

Hole 123 is formed in the cotyledons (and optionally also the seed coat) of the seed prior to germination (FIGS. 6A1-C, 7A-C). When forming hole 123, measures must be taken so as not to harm the plant embryo (the cells capable of proliferation and differentiation into the hypocotyl, which comprises, at its air facing end, the shoot epical meristem and at its ground facing end, the root epical meristem). Hole 123 results in discarding some of the nutrients (e.g., proteins, carbohydrates and/or oils) contained in intact cotyledons of a pre-germinated seed, and when present some of the seed coat.

Flattened, elongated seeds, having a germination end and an apparent germination polarity, such as, but not limited to, sunflower (FIGS. 6A1, 6A2, shown coated and uncoated), cucumber (FIG. 6C, shown coated), watermelon (FIGS. 6B1 and 6B2, shown coated and uncoated) and pumpkin seeds, as well as many other seeds are suited for use in this aspect of the invention because one forming a hole in seeds having a germinating end and a germination polarity can easily avoid forming the hole on or next to the plant embryo. The germination end in seeds having an apparent directional polarity is typically as their pointed end. Hence, the hole can be made at or about the opposite, rounded, end (FIGS. 6A1-2), it can be made in the center of the rounded end (FIGS. 6B1-2) or at the center of the seed (FIG. 6C). Central holes are formed in the center of the cotyledons and/or seed coat and are best suited to carry member 128 and whatever is attached thereto, e.g., a display article, because in this case the holes are also centered in the emerging cotyledons (and where applicable, the seed coat) (FIGS. 8A-B and 9A-B) which provide for improved structural stability of the seedling-member structure.

According to some embodiments of the invention, hole 123 is so positioned, shaped and sized, so as to accelerate the rate of the germination process of the germinateable seed, upon induction of germination by watering. Central positioning of hole 123 as described above assist to fastest hydration of germinating end 124 and homogenous hydration of seed 122. Hole 123 can be drilled by a suitable drill having an appropriate diameter, e.g., about 2 mm or less. Suitable drills include KOMET or BUSCH 203-008. Drilling may be effected at about 10 rpm to about 30 rpm, or about 10 rpm to about 20 rpm or at revolution rate lower than about 10 rpm, so as to avoid overheating of the seed in the drilling process. Hole 123 can alternatively be made by a suitable ablative laser, e.g., a medical or industrial laser. When forming hole 123 in seed 122, one must consider not only overheating, but also a formation of destructive shock waves. Both overheating and destructive shockwaves can be avoided by appropriately selecting the drilling or laser ablation parameters. Seed 122 having hole 123 formed therein and kept under dry conditions will germinate even after 6-12 months, and the rate of germination will be faster as compared to the same seed without a hole formed therein.

According to some embodiments of the present invention, germinateable seed 122 is a dicotyledonous seed forming a seedling 130 upon germination, seedling 130 having a hypocotyl 132 and a pair of cotyledons 134, member 128 passes through holes 123 in the cotyledons 134 and optionally through holes in coat 125 (when present).

According to some embodiments of the invention, member 128 is a ring (128a, FIG. 7A), a rod (128c FIG. 7C, e.g., a piercing rod having bead-like screws on both sides), a wire, a thread, a string, or a screw, a hook (128b FIG. 7B), as long as member 128 can be secured to seed 122 via hole 123.

According to some embodiments of the invention, member 128 forms a contextual, esthetic and/or a functional part of display article 170. For example, ring 128 may be an earring.

According to another aspect of the present invention there is provided a method for displaying a display article. The method according to this aspect of the invention comprises the following method steps, (i) providing in a vessel containing a planting medium an article-of-manufacturing in the planting medium, the article-of-manufacturing comprises: (a) a germinateable seed having a hole formed therethrough, a position and size of the hole being selected so as to maintain a germination ability of the germinateable seed; (b) a member attached to the germinateable seed through the hole; and (c) the display article attached to the member; and (ii) watering the germinateable seed so as to induce germination of the germinateable seed to an extent the display article being emerged above the planting medium.

Consequently to the above described method, further according to the present invention there is provided an article-of-manufacturing 200 comprising a seedling 130 of a dicotyledonous plant having a hypocotyl 132 and a pair of cotyledons 134 attached to hypocotyl 132; and a member 128 passing through holes 123 in cotyledons 134 (and optionally through coat 125).

Any one or more of the embodiments described hereinabove with respect to articles-of-manufacturing 20 and/or 80 or any of their constituents and/or accompanying elements, parts and/or functions, including, but not limited to, the plating medium, the vessel, the hydroponic watering, the bottom watering, the top watering, the removable top cover, the tray element and the display article described in, for example, context of FIGS. 1A-5C or elsewhere hereinabove, similarly applies to features, elements, parts and/or functions shown, described and/or implied from FIGS. 6A1-9B and its accompanying descriptions, including, without limitation, plating medium 152, vessel 150, hydroponic watering, bottom watering, top watering, removable top cover 160, tray element 162 and display article 170, any one of which may in some embodiments be applicable and optionally applies to articles-of-manufacturing 120 and/or 200.

Any of the articles-of-manufacturing described in this specification can be made to include a water reservoir for watering the seed. The water reservoir may form an integral part of or be attached or annexed to the vessel, such that by puncturing the water reservoir, planting medium is hydrated, so as to allow the seed to germinate. Further watering at a later stage may also be required.

As described above, watering induces germination. According to some embodiments and aspects of the invention, watering is performed in 2 intervals about 72 hours apart each of about 75% of the volume of the planting medium. Optimal germination is achieved for most seeds between 15 and 30 degree centigrade. After each watering session the vessel may be sealed or topped by a cover so as to reduce water evaporation.

According some embodiments of the invention, germination succeeds for up to 97-100% of the cases. This means that no refunds or exchanges have to be made, and make the articles-of manufacturing commercially attractive.

It is expected that during the life of a patent maturing from this application many relevant alternatives will be developed and the scope of the invention is intended to include all such new technologies a priori.

As used herein the term "about" refers to ±10%.

The terms "comprises", "comprising", "includes", "including", "having" and their conjugates mean "including, but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible sub ranges as well as individual numerical values within that range. For example, description of a range such as from 1 to 6 should be considered to have specifically disclosed sub ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

As used herein the term "method" refers to manners, means, techniques and procedures for accomplishing a given task including, but not limited to, those manners, means, techniques and procedures either known to, or readily developed from known manners, means, techniques and procedures by practitioners of the art.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. An article-of-manufacturing comprising (a) a germinateable seed having a hole formed therethrough, a position and size of said hole being selected so as to maintain a germination ability of said germinateable seed; and (b) a member attached to said germinateable seed through said hole.

2. The article-of-manufacturing of claim 1, wherein said germinateable seed comprise a seed coat.

3. The article-of-manufacturing of claim 1, wherein said germinateable seed is uncoated.

4. The article-of-manufacturing of claim 1, wherein said seed has a germinating end and an apparent germination polarity.

5. The article-of-manufacturing of claim 1, wherein said hole is so positioned, shaped and sized so as to accelerate a rate of a germination process of said germinateable seed upon watering.

6. The article-of-manufacturing of claim 1, wherein said germinateable seed is a dicotyledonous seed forming a seedling upon germination, said seedling having a hypocotyl and a pair of cotyledons, said member passes through holes in said cotyledons.

7. The article-of-manufacturing of claim 1, wherein said member comprises a ring.

8. The article-of-manufacturing of claim 1, wherein said member comprises a string.

9. The article-of-manufacturing of claim 1, wherein said member comprises a hook.

10. The article-of-manufacturing of claim 1, wherein said member is selected from the group consisting of a ring, a rod, a wire, a thread, a string, a screw and a hook.

11. The article-of-manufacturing of claim 1, further comprising a vessel containing planting medium said seed and member being placed in said planting medium.

12. The article-of-manufacturing of claim 11, wherein the planting medium comprises perlite or vermiculite.

13. The article-of-manufacturing of claim 11, wherein said planting medium comprises humidity which is insufficient to initiate germination of said germinateable seed.

14. The article-of-manufacturing of claim 11, wherein said vessel is openably sealed.

15. The article-of-manufacturing of claim 11, wherein said vessel is adapted for upper watering.

16. The article-of-manufacturing of claim 11, wherein said vessel has a removable top cover.

17. The article-of-manufacturing of claim 1, further comprising a display article attached to said member.

18. An article-of-manufacturing comprising (a) a seedling of a dicotyledonous plant having a hypocotyl and a pair of cotyledons attached to said hypocotyl; and (b) a member passing through holes in said cotyledons.

19. The article-of-manufacturing of claim 18, wherein said germinateable seed comprise a seed coat.

20. The article-of-manufacturing of claim 18, wherein said dicotyledonous seedling is a bean seed.

21. The article-of-manufacturing of claim 18, wherein said member comprises a ring.

22. The article-of-manufacturing of claim 18, wherein said member comprises a hook.

23. The article-of-manufacturing of claim 18, further comprising a vessel containing planting medium said seed and member being placed in said planting medium.

24. The article-of-manufacturing of claim 18, further comprising a display article attached to said member.

25. A method for displaying a display article, the method comprising:
  (i) providing in a vessel containing a planting medium an article-of-manufacturing in said planting medium, said article-of-manufacturing comprises:
    (a) a germinateable seed having a hole formed therethrough, a position and size of said hole being selected so as to maintain a germination ability of said germinateable seed;
    (b) a member attached to said germinateable seed through said hole; and
    (c) the display article attached to said member; and
  (ii) watering said germinateable seed so as to induce germination of said germinateable seed to an extent said display article being emerged above said planting medium.

* * * * *